US006858044B1

(12) United States Patent
Danner et al.

(10) Patent No.: US 6,858,044 B1
(45) Date of Patent: Feb. 22, 2005

(54) INCREASING THE WET SLIPPAGE PROPERTIES OF TEXTILES MATERIAL, AND WET-ACTING LUBRICANTS FOR THIS PURPOSE

(75) Inventors: Bernard Danner, Riedisheim (FR); Francis Palacin, Riedisheim (FR)

(73) Assignee: Clariant Finance (BVI) Limited, Tortola (VG)

( * ) Notice: Subject to any disclaimer, the term of this patent is extended or adjusted under 35 U.S.C. 154(b) by 10 days.

(21) Appl. No.: 10/088,442

(22) PCT Filed: Sep. 21, 2000

(86) PCT No.: PCT/IB00/01332

§ 371 (c)(1),
(2), (4) Date: Mar. 15, 2002

(87) PCT Pub. No.: WO01/21880

PCT Pub. Date: Mar. 29, 2001

(30) Foreign Application Priority Data

Sep. 22, 1999 (EP) .............................. 99810847

(51) Int. Cl.$^7$ .............................. D06P 1/607; D06P 5/02
(52) U.S. Cl. ................... 8/531; 8/552; 8/554; 8/648; 8/930; 8/611
(58) Field of Search ............................ 8/552, 554, 648, 8/531, 614, 924, 930; 528/329.1, 335, 340; 524/501

(56) References Cited

U.S. PATENT DOCUMENTS

| 3,882,090 | A |   | 5/1975  | Fagerburg et al.           |
|-----------|---|---|---------|----------------------------|
| 5,378,798 | A | * | 1/1995  | Ehrlich .......... 528/310  |
| 5,672,677 | A | * | 9/1997  | Morganelli et al. ...... 528/339.3 |
| 5,820,982 | A |   | 10/1998 | Salsman                    |
| 5,837,802 | A | * | 11/1998 | Van Lith et al. ............ 528/310 |
| 6,077,900 | A | * | 6/2000  | Boudreaux et al. ......... 524/501 |
| 6,204,353 | B1|   | 3/2001  | Eicken et al.              |

FOREIGN PATENT DOCUMENTS

| DE | 1 595 669 |   | 7/1970  |
| DE | 41 07 283 |   | 9/1992  |
| EP | 0 000 898 |   | 3/1979  |
| EP | 0 018 947 |   | 11/1980 |
| EP | 0 506 613 |   | 9/1992  |
| GB | 1108811   | * | 4/1968  |
| GB | 1108812   |   | 4/1968  |
| GB | 1146675   |   | 3/1969  |
| GB | 1170300   |   | 11/1969 |
| GB | 2 128 202 |   | 4/1984  |
| GB | 2 282 153 |   | 3/1995  |
| WO | 85/03959  |   | 9/1985  |
| WO | 98/00449  |   | 1/1998  |

OTHER PUBLICATIONS

English abstract for EP 0000898, Mar. 7, 1979.
English abstract for EP 0506613, Sep. 30, 1992.
Martin J. Schick, "Nonionic Surfactants", Marcel Dekker, Inc., New York, 1967, Title page and Table of Contents.

* cited by examiner

Primary Examiner—Margaret Einsmann
(74) Attorney, Agent, or Firm—Anthony A. Bisulca

(57) ABSTRACT

Use of
($P_A$) water-dispersible or colloidally soluble polyamides which contain hydrophilic polyalkylene glycol ether chains in the skeletal structure as wet-acting lubricants in the treatment of textile piece goods in rope or tubular form with a textile treatment agent (T) by exhaust methods from aqueous liquor under conditions which would otherwise in the textile substrate favor the formation of transport folds and/or the occurrence of friction in or on the substrate, particularly as wet-acting lubricants in the dyeing of polyamides in the jet, the corresponding wet-acting lubricants, certain polyamide preparations and certain polyamides, and their production.

13 Claims, No Drawings

INCREASING THE WET SLIPPAGE PROPERTIES OF TEXTILES MATERIAL, AND WET-ACTING LUBRICANTS FOR THIS PURPOSE

In the treatment of textile material in the form of textile piece goods, particularly in rope form or tubular form, essentially during pre-treatment, dyeing, optical brightening or after-treatment, in aqueous liquor under such conditions that transport folds can form in the textile substrate or abrasion can take place of substrate to adjacent substrate or apparatus parts—in particular in jet dyeing machines and in winch becks —, undesired phenomena are the marking of the transport folds and the formation and marking of chafe points, which then, as unlevel features, impair the fabric appearance and possibly also the physical properties of the treated goods and consequently of the finished goods. In order to counter these interfering phenomena, wet-acting lubricants (i.e. wet acting slip agents), which reduce the tendency toward a the formation or stabilisation and consequently the marking of folds, in particular co transport folds, and reduce the substrate/substrate and substrate/metal friction and consequently the tendency toward the formation and marling of chafe points, are employed in the corresponding process steps. It has already been proposed to employ wax dispersions of different types as lubricants (or slip agents) for avoiding the formation of transport folds or creases, e.g. as described in GB-A-2128202 or 2282153. In EP-A-506613 there are described for a similar purpose compositions containing polymers of the radicalic polymerisation of ethylenically unsaturated monomers (especially acrylic polymers) in admixture with esters of polyols with a $C_{8-26}$-fatty acid.

In the following further documents there are described various polyamides, which are however not employed as wet acting lubricants in exhaust processes: In GB-A-1108811 and 1146675 there are described various polyamides which are applied by impregnation of the substrate with the polyamide-containing liquor and heat-treatment, in order to achieve a highly permanent antistatic finish of the substrate. In GB-A-1108811 there are more particularly described polyamides derived from (1) a dicarboxylic acid with (2) a mixture of (a) a diaminopolyalkyleneoxy compound with (b) a diamine, aminoacid and/or lactam (including also those of GB-A-1108812, which serve for the production of shaped articles of certain tenacity and extensibilty properties), which are applied to the substrate in the form of a solution or dispersion. Although the generic description includes as (a) various aminoterminated polyoxyalkylene compounds, there is no specific mention of amino-mono- or oligo)-propoxy terminated polyethylene glycols of the kind of the Jeffamines. In GB-A-1146675 the described polyamides are condensation products of (1) a dicarboxylic acid of functional derivative thereof with (2) a mixture of (a) a polyalkyleneoxy compound containing at least three primary amino groups, with (b) a diamine, aminoacid and/or lactam, which are applied to the substrate in the form of a dispersion (which as shown in the examples is obtained in two steps by first producing a coarse dispersion by agitation of the polyamide with water and then gravel-milling this coarse dispersion). The amines (a) are branched and contain 3 or more $NH_2$ groups, so as to lead to correspondingly cross-linked polyamides. In DE-A-1595669 there are described certain elastomeric block copolyether(ester)amides, which are produced e.g. in an organic solvent and are spun in water. In U.S. Pat. No. 3882090 there is described the production of polyamides by condensation of (A) dicarboxylic acid which is adipic, pimelic and/or suberic acid, (B) a modifying $C_9$ or $C_{12}$ dicarboxylic acid, and (C) an aliphatic diamine, at least 95 mol-% of which is a bis(aminopropoxy) terminated polyalkyleneoxy compound (where alkylene is ethylene or propylene). These polyamides serve as adhesives or sizes, and must be water soluble; the kind, nolecular weight and content of bis(aminopropoxy) terminated polyalkyleneoxy compound in the polyarmide being such that, after application to the substrate, the polyamide is readily soluble in water.

The polyamides described in these above further documents are not described for use as wet acting lubricants in exhaust processes, but are rather polyamides of a certain defined composition made for meeting the particular application or production purposes, such as perranent antistatic finish (GB-A-1108811 and 1146675), production of the elastomeric polymer in solution or substance (DE-A-1595669), production of elastomeric polymrs for the production of shaped articles of certain tenacity and extensibilty properties (GB-A-1108812), or solubility of size or adhesive polymer (U.S. Pat. No. 3,882,090).

In the constant refinement of the processes and machines with the aim of increasing the output and an environmentally acceptable procedure, machines and processes are being developed which are designed for higher speeds or higher outputs and/or which work with shorter liquor ratios. Greater demands are thus also made of the lubricants employed. Thus, for example, they must be resistant to particularly high shear forces while developing their action as well as possible for short liquors too. The shorter the liquor, the greater the requisite efficacy of the respective treatment agents since wet slippage of the goods and the achievement of a level, smooth goods appearance without damage to the goods is made more difficult the greater the proportion of liquor taken up by the goods.

It has now been found that certain polyalkylene glycol ether-containing polyamides having a certain hydrophilicity, as is sufficient for the polyamide to be dispersible or only colloidally soluble in water, in particular self-dispersible or colloidally soluble, surprisingly have an advantageous action as wet-acting lubricants (i.e. as wet acting slip agents) in the treatment of textile material in the form of textile piece goods, in rope form or tubular form, particularly made from polyamide fibres, in jet dyeing machines, where, for example, they do not hinder or impair the dyeing, but act surprisingly well and extremely superficially on the wet substrate as wet-acting lubricants in surprisingly high efficiency and yield, and further with a high degree of constancy and reproducibility of these properties, even if the products employed come from different lots and/or have been stored for a prolonged time.

The invention relates to the use of such polyamides, as defined below as ($P_A$), as wet-acting lubricants for the exhaust treatment of textile material in the form of textile piece goods, particularly in rope form or tubular form, to the corresponding wet-acting lubricants, certain polyamide preparations, and certain polyamides, and to their production.

A first subject-matter of the invention is thus the use of
($P_A$) water-dispersible or colloidally soluble polyamides which contain hydrophilic polyalkylene glycol ether chains in the skeletal structure as wet-acting lubricants in the treatment of textile piece goods in rope form or tubular form with a textile treatment agent (T) by exhaust processes from aqueous liquor under conditions which would otherwise in the textile substrate favour the formation of transport folds and/or the occurrence of friction in or on the substrate or respectively is a process for the treatment of textile piece goods in rope form or tubular form with a textile treatment agent (T) by exhaust processes from aqueous liquor under conditions which would otherwise in the textile substrate favour the formation of transport folds and/or the occurrence of friction in or on the substrate, characterized in that the process is carried out in the presence of a water-dispersible or -colloidally soluble polyamides ($P_A$) which contain hydrophilic polyalkylene glycol ether chains in the skeletal structure, as a wet-acting lubricant.

As polyamides ($P_A$), it is possible to employ known polyamides or polyamides which can be produced analogously to known polyamides. For the production of the polyamides ($P_A$), it is advantageous to use starting materials—in particular monomers suitable for the formation of polyamide chains by polycondensation and/or in the case of lactams also polyaddition, polymerisation reaction—which are suitable for the formation of linear polyamide chains, in particular difunctional compounds (D), which are monomers suitable for polyamidation (i.e. polymerisation by amidation), and optionally monofunctional compounds (E) which are suitable for the end capping of the polyamides, and/or higher oligo-functional compounds (H) which are suitable for the branching of the polyamides. The polyamides ($P_A$) to be employed in accordance with the invention are dispersible (preferably self-dispersible) or colloidally soluble (preferably colloidally self-soluble) in water and contain in the respective molecule at least one hydrophilic constituent and at least one hydrophobic constituent, so that the polyamide formed has a corresponding hydrophilicity and is dispersible or colloidally soluble, in particular self-dispersible or at most colloidally self-soluble, in water. The term self-dispersible or colloidally self-soluble in water is taken to mean products which are capable, without the assistance of surfactants, of forming a dispersion or colloidal solution by simple mixing with water. The components for the production of the polyamides ($P_A$) are of course selected in such away that ($P_A$) may display the stated properties, in particular dispersibility or respectively colloidal solubility in water. The mono-, di- and higher oligo-functional compounds are essentially carboxylic acids or suitable functional derivatives thereof, principally halides (particularly bromides, iodides or preferably chlorides) or cyclic anhydrides on the one hand and amines, in particular diamines, principally diprimary diamines, on the other hand which, through amidation, lead to corresponding carboxylic acid amide groups, or also aminocarboxylic acids or lactams of aminocarboxylic acids or lactams of aminocarboxylic acids which, through polymerization, lead to corresponding polyamides. They may optionally contain one or also several substituents (preferably with the exception of those that can interfere with the polymerisation or can significantly shift the ionicity of the product, in particular further anionic or basic or cationic groups and, for example, hydroxyl, keto, ester and analogous substituents), for example ether-like substituents, such as methoxy, ethoxy, propoxy, polyethoxy and polypropoxy, and/or heteroatomic bridging units (preferably with the exception of those that can interfere with the polymerisation or can significantly shift the ionicity of the product, in particular keto, sulfone, ester and ammonium groups and basic amino groups), for example —O—, —CO—NH— or

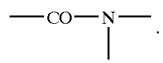

Suitable as difunctional monomers (D) are, in particular,
(A) aliphatic, araliphatic or aromatic diamines, preferably those in which the two amino groups are primary and/or secondary amino groups, in particular
  ($A_1$) aliphatic, araliphatic or aromatic diamines which otherwise contain no hydrophilic components or substituents, in particular alkanediamines having 2 to 18 carbon atoms, where the alkane radical may be linear or branched, or, if it contains 6 to 18 carbon atoms, also cyclic, and the two amino groups are separated from one another by at least two carbon atoms (that is α,β to α,ω), di($C_{1-2}$-aminoalkyl) benzenes, piperazine, water-insoluble polyetherdiamines, and araliphatic and aromatic diamines which contain one or two benzene rings, and ($A_2$) aliphatic diamines which contain at least one hydrophilic polyethylene glycol chain, principally water-soluble polyalkylene glycol diamines in which the polyalkylene glycol ether chain contains ethyleneoxy units and may optionally contain further alkyleneoxy units, but are otherwise further unsubstituted, in particular propyleneoxy and/or butyleneoxy, and may be homopolymers, copolymers or also block polymers, particularly products of the arminoalkylation of such polyalkylene glycols (in particular polyethylene glycols and copolyethylene-propylene glycols), for example of the average formula

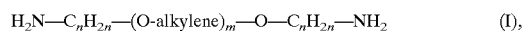

in which
  alkylene denotes ethylene or propylene,
  m denotes a number from 2 to 100, preferably 6 to 60,
  and n denotes 2 to 4, preferably 3,
  where at least 50 mol-% of the m alkylene groups denote ethylene
  and the remainder denote 1,2-propylene,
  in particular those of the average formula

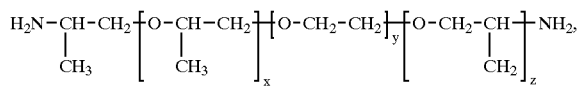

in which
  x denotes a number $\geq 0$,
  y denotes a number $\geq 2$
  and z denotes a number $\geq 1$,
  and the sum x+y+z=3 to 100, with the proviso that $y \geq x+z$.
(B) aliphatic, aromatic or aralipathic dicarboxylic acids, in particular
  ($B_1$) aliphatic dicarboxylic acids having 2 to 36 carbon atoms (particularly alkanedicarboxylic acids), aromatic dicarboxylic acids having one to three benzene rings, two of which may optionally be fused, or aralipathic dicarboxylic acids which contain 9 to 18 carbon atoms and contain one benzene ring or two optionally fused benzene rings, where aromatic rings may be bonded to further aliphatic, aromatic or aralipathic parts of the molecule, optionally via oxygen,
  and ($B_2$) aliphatic or aralipathic dicarboxylic acids which contain at least one hydrophilic polyethylene glycol ether chain,
(C) aliphatic aminomonocarboxylic acids, in particular
  ($C_1$) aliphatic unsubstituted aminocarboxylic acids having 3 to 18 carbon atoms, optionally in lactam form, or prepolymers (polyamides) thereof.

As (A₁), mention may be made, for example, of the following: polymethylenediamines of the formula

$$H_2N-(CH_2)_p-NH_2 \quad (II),$$

in which p denotes 4 to 12, 1,5-diamino-2-methylpentane, 4,7-dioxadecamethylenediamine, 1-amino-3,3,5-trimethyl-5-aminomethylcyclohexane (isophoronediamine), 1,3-di (aminomethyl)benzene, 1,4-di(aminomethyl)benzene, m- or p-phenylenediamine, dixylylenediamine, 4,4'-oxydianiline, piperazine, 4,4'-diaminodicyclohexylmethane, or also productrs of the aminopropylation of polypropylene glycols (for example as are known under the name "Jeffamine®") and amino-terminated polycaprolactams from the adduction of a monomeric lactam onto an alkanediamine (for example one of those mentioned above). Of the diamines (A₁), the aliphatic diamines which otherwise contain no hydrophilic components or substituents, principally $C_{4-8}$-alkanediamines, are preferred, in particular hexamethylenediamine.

As (A₂), mention may be made, for example, of the following: products of the aminoalkylation of polyethylene glycols (for example having an average molecular weight $\overline{M}_W$ in the range from 200 to 4000, preferably 400 to 3000), of copolyalkylene glycols which consist predominantly of ethyleneoxy units and the remainder of butyleneoxy and/or preferably propyleneoxy units (for example those with an average molecular weight $\overline{M}_W$ in the range from 300 to 5000, preferably 500 to 4000), preferably of products of the adduction of propylene oxide onto polyethylene glycols (for example as are known under the name "Jeffamine®"). The aminoalkylation products are advantageously aminoethylation products, aminobutylation products or preferably aminopropylation products, for example those as are obtainable by adduction of acrylonitrile or acrylamide or respectively methacrylonitrile or methacrylamide and hydrogenation of the product to the corresponding diamine or by adduction of ethyleneimine, propyleneimine or butyleneimine, especially those of the formula (Ia). Of the diamines of the formula (Ia), preference is given to those in which y is in the range from 2·(x+z) to 10·(x+z).

As (B₁), mention may be made, for example, of the following: oxalic acid, adipic acid, succinic acid, glutaric acid, pimelic acid, suberic acid, azelaic acid, sebacic acid, dimethylmalonic acid, 2,2- or 2,3-dimethylsuccinic acid, diglycolic acid, 3,3'-oxydipropionic acid, trimethyladipic acid, orthophthalic acid, isophthalic acid, terephthalic acid, oxydibenzoic acid, naphthalene-2,6-dicarboxylic acid, naphthalene-1,8-dicarboxylic acid, naphthalene-1,4-dicarboxylic acid, 1,2-di(p-carboxyphenoxy)-ethane, 1,2-di (p-carboxyphenyl)ethane, biphenyl-2,2'-dicarboxylic acid, 1,4-cyclohexanedicarboxylic acid and dimerised oleic acid. Of the aliphatic dicarboxylic acids (B₁), preference is given to the α,ω-dicarboxylic acids; of the aliphatic, aromatic and araliphatic dicarboxylic acids (B₁), preference is given to the aliphatic ones, particularly the alkanedicarboxylic acids, particularly those having 4 to 12 carbon atoms, especially adipic acid.

AS (B₂), mention may be made, for example, of the following:
polyoxyalkylenedicarboxylic acids, for example from the carboxymethylation of polyalkylene glycols or from the catalytic or electrochemical oxidation of the terminal CH₂—OH groups of polyalkylene glycols to COOH groups, where the polyalkylene glycols are preferably polyethylene glycols and/or copolyethylene-propylene glycols.

As (C₁), mention may be made, for example, of the following: alanine, 4aminobutyric acid, 5-aminovaleric acid, 6-aminocaproic acid, 8-aminocaprylic acid and 12-aminododecanoic acid- and the corresponding lactams, for example γ-butyrolactam, δ-valerolactam, ε-caprolactam, γ-methyl-ε-caprolactam, γ-ethyl-εcaprolactam, γ-n-propyl-ε-caprolactam, γ-isopropylε-caprolactam, γ-t.butyl-ε-caprolactam, γ-cyclohexyl-δcaprolactam, ε-methyl-ε-caprolactam, ε-ethyl-ε-caprolactam, ε-n-propyl-ε-caprolactam and 8-caprylolactam, and prepolymers thereof.

Suitable monofunctional compounds (E) for the end capping of the polyamides are, for example,
(E₁) simple amines or carboxylic acids which do not contribute towards the hydrophilicity of the polyamide,
and (E₂) amino or carboxyl compounds which may contribute towards the hydrophilicity of the polyamides, particularly those which contain hydrophilic polyalkylene glycol ether chains.

Suitable as (E₁) are, in particular,
(E₁₁) simple aliphatic or araliphatic amines, for example benzylamine, mono($C_{1-2}$-alkyl)amines, di($C_{4-6}$-alkyl) amines and cyclic $C_{9-12}$-alkylamines,
and (E₁₂) simple aliphatic, araliphatic or aromatic monocarboxylic acids, for example $C_{6-12}$-alkanoic acids and optionally alkyl-substituted benzoic acids.

Suitable as (E₂) are, in particular,
(E₂₁) aliphatic or araliphatic amino compounds which contain a hydrophilic moiety, for example a polyalkylene glycol ether chain,
and (E₂₂) aliphatic or araliphatic carboxyl group-containing, hydrophilic compounds which contain a hydrophilic moiety, for example a polyalkylene glycol ether chain.

As (E₁₁), mention may be made, for example, of the following: n-octylamine, n-laurylamine and dicyclohexylamine.

As (E₂₁), mention may be made, for example, of the following: benzoic acid, caprylic 1,5, acid and caproic acid.

As (E₂₁), mention may be made, for example, of the following: products of the aminoalkylation of adducts of ethylene oxide and/or propylene oxide, and optionally butylene oxide or styrene oxide, onto an aliphatic monoalcohol having 1 to 18 carbon atoms or onto an alkylphenol having a total of 10 to 24 carbon atoms, where at least 50 mol-% of the alkyleneoxy groups present are advantageously ethyleneoxy groups, and the incorporated polyalkylene glycol ether chains are preferably those consisting predominantly of ethyleneoxy units and the remainder of propyleneoxy units, or those consisting exclusively of ethyleneoxy units (for example up to an average molecular weight in the range from 200 to 4000, particularly from 400 to 3000). Of these, products of the aminoalkylation of products of the adduction of ethylene oxide or ethylene oxide and propylene oxide onto a low-molecular-weight alkanol (in particular $C_{1-4}$ alkanol) are preferred. The aminoalkylation products are, for example, aminoethylation products, aminobutylation products or preferably aminopropylation products, for example those as are obtainable by adduction of acrylonitrile or acrylamide or respectively methacrylonitrile or methacrylamide and hydrogenation of the product to the corresponding diamine or by adduction of ethyleneimine, propyleneimine or butyleneimine (for example those as are also known under the name "Jeffamine®").

As (E₂₂), mention may be made, for example, of the following: products of the carboxymethylation of adducts of ethylene oxide and/or propylene oxide onto an aliphatic monoalcohol having 1 to 18 carbon atoms, where at least 50 mol-% of the alkyleneoxy groups present are advantageously ethyleneoxy groups and the incorporated polyalkylene glycol ether chains are preferably those which consist exclusively of ethyleneoxy units (for example up to an average molecular weight in the range from 200 to 4000), or products of the catalytic or electrochemical oxidation of the terminal —CH$_2$—OH groups of such adducts to give terminal POOH groups.

Suitable as (H) are tri- and higher oligo-functional compounds which can lead to branched products with amide formation, in particular (H$_1$) compounds containing 3 to 10 aliphatic amino groups, and (H$_2$) compounds containing 3 or more, for example 3 or 4, carboxyl groups, Suitable as (H$_1$) are, for example, linear oligoalkylene oligoamines with two NH$_2$ groups, for example those having 3 to 6 amino groups and having 2 to 5 C$_{2-3}$-alkylene groups, for example diethylenetriamine, dipropylenetriamine, triethylenetetramine, tetraethylenepentamine and pentaethylenehexamine.

As oligocarboxylic acids (H$_2$), aliphatic, araliphatic or preferably aromatic compounds may be employed, for example having 6 to 15 carbon atoms, preferably benzenetricarboxylic acids (in particular trimellitic acid, hemimellitic acid or trimesic acid).

Preferably, no branching or crosslinking products (H) are employed. I.e. preferably (P$_A$) is a substantially linear polyamide of (D) and optionally (E).

With particular preference, no end-capping products (E) are employed either.

The polyamides (P$_A$) advantageously have substantially non-ionic character, with any terminal non-amidated basic amino group and/or any terminal non-amidated carboxyl group in salt form preferably being essentially the only capable of providing the product (P$_A$) with ionic character.

For the production of the polyamides (P$_A$) to be employed in accordance with the invention, it is advantageous to employ difunctional compounds, in particular diamines (A), which are reacted with corresponding dicarboxylic acids, in particular of type (B) or functional derivatives thereof and optionally with aminomonocarboxylic acids of type (C), or products of the polymerisation of aminocarboxylic acids (or lactams thereof), in particular of type (C), which are optionally reacted further with (poly)amides made from diamines, in particular of type (A), with corresponding dicarboxylic acids, in particular of type (B), or functional derivatives thereof, or with salts between (A) and (B). If desired, monofunctional and/or higher oligo-functional compounds, for example of type (E) or (H), can be employed in order, in particular with (H), to produce branched polyamides, or with (E), to cap an end group (amino or carboxyl group). The relative amounts or molar ratios of the respective starting compounds are advantageously selected in such a way that the polyamides produced therefrom have the desired hydrophilicity properties, i.e. in particular in such a way that the polyamides, besides a hydrophobic moiety, also have a hydrophilic moiety, which can be controlled, in particular, through a suitable choice of corresponding starting compounds. Thus, for example, hydrophobic moieties are built up with diamines of type (A$_1$) or with dicarboxylic acids of type (B$_1$) or aminomonocarboxylic acids of type (C$_1$), while hydrophilic moieties are introduced with components of type (A$_2$) or (B$_2$). A contribution towards the hydrophilicity of the polyamides is also made with compounds of type (E$_{21}$) and (E$_{22}$). Preferably, the more hydrophilic monomer, preferably (A$_2$) or (B$_2$), is first reacted with a more hydrophobic amidation reagent, preferably with (B$_1$) or (A$_1$) or/and (C$_1$), to give a carboxyl-terminated or amino-terminated prepolymer (in particular an oligoamide), and this is then reacted further with a more hydrophobic component, particularly (A$_1$) or (B$_1$) and optionally (C$_1$). For the production of the preferred polyamides (P$_A$) from (A$_1$), (A$_2$) and (B$_1$), (A$_2$) is advantageously first reacted with (B$_1$) to give a prepolymer (oligomer), and this is then further polymerised with (A$_1$).

The amidation reaction can be carried out in a manner known per se, with the respective selected components (D) and optionally (H) and/or (E) being reacted, optionally also with addition of suitable catalysts and/or solvents, for example by direct amidation at temperatures in the range from 150 to 250° C., preferably from 160 to 200° C., preferably from 170 to 190° C., in the absence of solvents, or by reaction of the amines with acid chlorides in an inert solvent (for example dimethylacetamide or N-methylpyrrolidone) under dehydrochlorinating conditions, for example in the temperature range from 0 to 50° C., preferably 0 to 25° C. The polyamidation can be carried out (if desired in the presence of an inert solvent or preferably in the absence of any solvent) under reduced pressure, after which water can be added if desired, advantageously in such an amount that the reaction mixture is stirrable.

Since the amidation is also accompanied by an increase in viscosity, which is particularly evident during cooling, before water addition or even at the beginning of the water addition, it is advantageous to add, before the water addition, (F) at least one flow auxiliary.

Suitable flow auxiliaries (F) here are auxiliaries which are able to modify the flow properties, in particular the viscosity, of the reaction material before, during and particularly also after addition of water, in such a way that the material is and remains readily stirrable and—expressed as rotational viscosity—is, for example, in the range from 50 to 105 cP, preferably from 100 to 50000 cP. The flow auxiliaries (F) can be either rheology auxiliaries or auxiliaries which can be employed for thermally caused viscosity changes, i.e. they can be either products which lower the melting range of the entire reaction material or also those which are able to counter any viscosity increases caused by temperature reductions. The compounds (F) are advantageously those which have a boiling point and a flash point which is higher than the reaction temperature, and which are inert per se to the amidation reaction and are essentially not reacted with the reagents under the amidation conditions. In particular, (F) can be known aliphatic compounds, which can be alcohols and/or ethers, such as, for example, glycerol, ethylene glycol, propylene glycol, butanediol, hexylene glycol, dipropylene glycol, dipropylene glycol monoalkyl ethers (for example C$_{1-4}$-alkyl ethers), polyethylene glycols for example with an average of 2 to 20, preferably 3 to 10 ethyleneoxy units in the molecule, and their monoalkyl ethers, for example C$_{1-4}$-alkyl ethers, or also tertiary amides, such as, for example, N-methylpyrrolidone, of which propylene glycol, butanediol, hexylene glycol, dipropylene glycol, butyl diglycol and especially glycerol are preferred. The flow auxiliaries (F) are advantageously employed in an effective amount in order to achieve the respective viscosity ranges, for example from 2 to 60% by weight, advantageously from 5 to 50% by weight, based on (P$_A$).

The addition of water for the production of dispersions or colloidal solutions of (P$_A$) is advantageously carried out in a suitable temperature programme, i.e. so that the addition of water and the temperature reduction—taking into account the increase in viscosity—are matched to one another, for example at temperatures in the range from 160° C. to room temperature, at least some of the water advantageously being added at from 100° C. to 160° C. and any further dilution with water is then carried out at below 100° C. Advantageously, sufficient water is added so that an aqueous dispersion or colloidal solution is formed and the mixture is readily stirrable, and its viscosity is, for example, in the above-mentioned viscosity range. For example, sufficient water is added so that the total water content of the aqueous product is in the range from 5 to 98% by weight, preferably from 10 to 95% by weight. According to an embodiment of the process, the amidation can also be followed by addition of at least some of the total amount of water so long as the aqueous mixture is stirrable, for example so that the water content is in the range from 5 to 50% by weight, and the remainder can then be added subsequently in order to set the desired final concentration.

The respective molar ratios are advantageously selected in such a way that no significant excess of amino or carboxyl compounds is employed overall, but instead in such a way that they are employed in a stoichiometric ratio, where a deviation of up to ±5 mol-%, preferably up to 2 mol-%, can be tolerated. If higher oligo-functional compounds of type (H) are employed, their molar ratio to the difunctional compounds (D) employed is advantageously kept low. It is in particular advantageous to select the respective molar ratios in such a way that no significant crosslinking takes place, principally in such a way that aqueous dilution of the product does not form gelatinous, irreversible agglomerates, but instead a dispersion or colloidal solution. If, for example, the starting materials are diamines ($A_1$) and ($A_2$), dicarboxylic acids ($B_1$), a polyamine ($H_1$) and optionally a monofunctional compound ($E_{21}$), it is advantageous to employ $\leq 1$ mole equivalent, preferably >0.5 mole equivalent, of ($H_1$), for example from 0.002 to 0.4 mole equivalent thereof, per mole of introduced diamines [($A_1$)+($A_2$)]. The molar ratio ($E_{21}$)/[($A_1$)+($A_2$)] is then advantageously in the range from 0.0002 to 1.5, preferably in the range from 0.002 to 0.4, particularly preferably in the range from 0.02 to 0.2. One mole equivalent of (H) is taken to mean one mole of (H) divided by the number of functional groups; in the case of the oligoamines ($H_1$), one mole equivalent of ($H_1$) is thus one mole of ($H_1$) divided by the number of its acylatable amino groups. Through the reaction with (H), branched or optionally also dendromeric polyamides or oligoamides ($P_A$) can be produced.

Preferably no oligofunctional compounds (H) are employed, so that substantially linear polymers ($P_A$) are formed. More preferably no (H) and no (E) are employed.

The reaction is advantageously controlled in such a way that the average molecular weight $\overline{M}_W$ of the polyamides produced is $\geq 2000$, and principally in the range from 3000 to $10^7$ preferably in the range from 5000 to $10^6$, particularly preferably in the range from 10000 to $5 \cdot 10^5$. According to a preferred procedure, the synthesis of the polyamides to be employed in accordance with the invention is carried out in such a way that the degree of polymerisation can be kept relatively low, in particular in such a way that oligoamides are formed.

Any residual carboxyl groups, present in the polyamide ($P_A$) may be in the form of the free acid and if desired can be converted into a salt form by reaction with corresponding bases, where for the salt formation cations known per se, preferably hydrophilising cations, come into consideration, for example alkali metal cations (for example lithium, sodium or potassium) or ammonium cations {for example unsubstituted ammonium, mono-, di- or tri-($C_{1-2}$-alkyl) ammonium, mono-, di- or tri-($C_{2-3}$-hydroxyalkyl) ammonium, mono-, di- or tri-[($C_{1-2}$-alkoxy)($C_{2-3}$-alkyl)] ammonium or morpholinium}, for which, for example, corresponding alkali metal hydroxides or carbonates, ammonia or the respective amines can be employed, preferably in the form of aqueous solutions. Analogously, the residual amino groups in the polyamide ($P_A$) can be in the form of the free base or, if desired, be converted into the corresponding protonated form by reaction with an acid (for example a monobasic mineral acid, in particular hydrochloric acid, or preferably a low-molecular-weight aliphatic carboxylic acid, preferably having 1 to 4 carbon atoms, for example formic acid, acetic acid or lactic acid).

The hydrophilicity of the products is controlled in such a way that the polyamides ($P_A$) produced are dispersible to colloidally soluble in water (preferably self-dispersible to colloidally soluble in water), i.e. that they give, in a concentration of from 0.1 to 30% by weight, optionally with the assistance of suitable dispersants in an amount of up to 50% by weight, based on ($P_A$) and optionally heating, in water a corresponding 0.1 to 30% (A) dispersion or colloidal solution or, for the self-dispersible to colloidally soluble ones, even without the assistance of dispersants, give with water, through simple stirring and optionally heating and/or cooling, an aqueous 0.1 to 30% ($P_A$) dispersion or an aqueous 0.1 to 30% colloidal ($P_A$) solution. A dispersion or colloidal solution of this type may be cloudy or translucent to transparent, but can in the latter case still be recognised through the Tyndall effect.

Where as (A) there are employed ($A_1$) and ($A_2$) the molar ratio of ($A_2$) to the total diamines ($A_1$)+($A_2$) is chosen in such a way as to provide the required dispersibility or colloidal solubility of the polymer, and is in general below 95 mol-%, e.g. even below 80 mol-%.

In polyamides and oligoamides ($P_A$) produced from adipic acid [as (B)], hexamethylenediamine (DA) [as ($A_1$)] and polyethylene glycols [as ($A_2$)] and Jeffamine ED 900 or 2000 [as ($A_2$)], the hydrophilicity can also be estimated, for example, from the (DA)/(J) weight ratio, where (DA) denotes the proportion by weight of amidated hexamethylenediamine and (J) denotes the proportion by weight of all amidated Jeffamine ED 900 or 2000. This (DA)/(J) weight ratio for the corresponding polyamides ($P_A$) is advantageously in the range from 1:3 to 1:60, preferably from 1:5 to 1:30. These values apply to the specific polyamides from the said starting components; if other and/or further components are used for the production of the polyamides ($P_A$), the values should be matched or changed correspondingly in order to achieve the corresponding hydrophilicity.

Of the polyamides ($P_A$), preference is given to the polyamides ($P_A'$), i.e. those which are self-dispersible or colloidally self-soluble in water, of these particularly the polyamides ($P_A''$), i.e. those which contain neither (H) nor (E), especially ($P_A'''$), i.e. those from the amidation of ($B_1$) using ($A_1$) and ($A_2$).

The polyamides ($P_A$) produced, which may also contain admixed (F), can be handled and used directly in the form of the aqueous preparations in which they were produced. They are advantageously used in the form of aqueous, preferably concentrated, preparations (W). These aqueous preparations (W) are dispersions or colloidal solutions of ($P_A$) and advantageously contain the polyamides ($P_A$) in a concentration in the range from 1 to 50% by weight, preferably from 2 to 40% by weight, particularly preferably from 3 to 25% by weight. The aqueous preparations (W) can be simple aqueous dispersions or colloidal solutions of ($P_A$) alone or preferably contain further additives, in particular (F) and/or (G) a thickening agent.

Suitable thickening agents (G) are preferably non-ionogenic and/or anionic substances which are known per se, in particular natural, modified or synthetic polymers. Examples of thickening agents (G) which can be employed are (co)poly(meth)acrylic acids and/or -amides, for example copoly(meth)acrylic acids/(meth)acrylamides and optionally partially saponified poly(meth)acrylamides and methylolation products thereof. The content of (meth)acrylic acid units is, for example, $\leq 50$ mol-%, preferably $\leq 36$ mol-%; if (meth)acrylic acid units are present in the polymer, their content is advantageously in the range from 2 to 50 mol-%, preferably from 5 to 36 mol-%, particularly preferably from 10 to 24 mol-%. The average molecular weight can be in the usual ranges, for example in the range from $2 \cdot 10^5$ to $5 \cdot 10^7$, preferably from $5 \cdot 10^5$ to $4 \cdot 10^7$. Of these, homopolyacrylamides, copolyacrylamide-acrylic acids and partially saponified polyacrylamides are particularly preferred. Advantageously, at least some of the acid groups, particularly the carboxylic acid groups, are in the form of salts, for example as alkali metal salts (principally sodium salts) and/or ammonium salts. At least some of the amide groups may, if desired—for example by reaction with formaldehyde or a formaldehyde-releasing compound—be methylolated, for example to the extent of from 1 to 100%, preferably from 2 to 80%, particularly from 5 to 60%, of all $CONH_2$ groups in the polymer. They can be employed as dry substance (for example as commercially available). If thickening agents (G) are employed, they are advantageously employed in such amounts that the viscosity of the aqueous concentrated dispersions (W) is <5000 mPa·s, in particular at values ≦1000 mPa·s, preferably in the range from 50 to 1000 mPa·s. The co concentration of thickening agent (G) in (W) is advantageously low, in particular lower than that of $(P_A)$, and is, calculated as dry substance, for example ≦5% by weight, advantageously from 0 to 4% by weight, preferably from 0.01 to 2% by weight.

If desired, the aqueous preparations (W) in addition to $(P_A)$ and optionally (F) and/or (G), may contain further additives, in particular one or more of the following components:

(X) a non-ionogenic emulsifier or a mixture of non-ionogenic emulsifiers or a mixture of non-ionogenic emulsifiers and anionic or amphoteric emulsifiers or a mixture of non-ionogenic emulsifiers, anionic emulsifiers and amphoteric emulsifiers, (Y) at least one agent for setting the pH and (Z) at least one formulation additive.

Suitable emulsifiers in (X) are principally the following:

$(X_1)$ a non-ionogenic emulsifier or a mixture of non-ionogenic emulsifiers, having an HLB of ≧7, and, as admixtures to $(X_1)$:

$(X_2)$ at least one anion-active emulsifier which is a carboxylic acid or sulphonic acid or a sulphuric acid partial ester or phosphoric acid partial ester or a salt thereof, or a mixture of such anion-active surfactants, having an HLB of ≧7, and/or $(X_3)$ at least one amphoteric emulsifier, which is preferably an aminocarboxylic or -sulphonic acid or a corresponding quaternary ammonium derivate.

Suitable emulsifiers $(X_1)$ are generally known compounds, essentially those having an emulsifier or dispersant character. Emulsifiers having a non-ionogenic character are known in large number in the art and are also described in the specialist litreature, for example in M. J. SCHICK "Non-ionic Surfactants" (Volume 1 of "Surfactant Science Series", Marcel DEKKER Inc., New-York, 1967). Suitable non-ionogenic emulsifiers $(X_1)$ are principally products of the oxyalkylation of fatty alcohols, fatty acids, fatty acid mono- or dialkanolamides (in which "alkanol" stands particularly for "ethanol" or "isopropanol") or fatty acid partial esters of tri- to hexafunctional aliphatic polyols or additionally products of the interoxyalkylation of fatty acid esters (for example of natural triglycerides), where suitable oxyalkylation agents are $C_{2-4}$-alkylene oxides and optionally styrene oxide, and preferably at least 50% of the introduced oxyalkylene units are oxyethylene units; advantageously at least 80% of the introduced oxyalkylene units are oxyethylene units; particularly preferably all the introduced oxyalkylene units are oxyethylene units. The starting materials for the addition of the oxyalkylene units (fatty acids, fatty acid mono- or dialkanolamides, fatty alcohols, fatty acid esters or fatty acid polyol partial esters) can be any desired conventional products as used for the production of such surfactants, principally those having 9 to 24, preferably 11 to 22, particularly preferably 16 to 22, carbon atoms in the fatty radical. The fatty radicals may be unsaturated or saturated, branched or linear; mention may be made, for example, of the following fatty acids: lauric acid, myristic acid, palmitic acid, stearic acid, oleic acid, arachic acid and behenic acid, and technical-grade fatty acids, for example tallow fatty acid, coconut fatty acid, technical-grade oleic acid, tall oil fatty acid and technical-grade soya oil acid, and products of the hydrogenation and/or distillation thereof; examples of fatty acid mono- or dialkanolamides which may be mentioned are the mono- or diethanolamides or mono- or diisopropanolamides of said acids; fatty alcohols which may be mentioned are the derivatives of the respective fatty acids mentioned and synthetic alcohols, for example from the oxo synthesis, from the Ziegler process and/or from the Guerbet process [for example isotridecanols, Alfol grades (for example Alfol 10, 12 or 14) and 2-butyloctanol]. Partial esters of said polyols which may be mentioned are, for example, the mono- or difatty acid esters of glycerol, erythritol, sorbitol or sorbitan, in particular sorbitol mono- or dioleates or mono- or distearates. Of the said products, preference is given to the oxyalkylated fatty alcohols, especially the products of the oxyethylation of linear fatty alcohols, in particular those of the following average formula

$$R_1\text{—}O\text{—}CH_2\text{—}CH_2\text{—}O)_p\text{—}H \qquad (III),$$

in which $R_1$ is an aliphatic, linear hydrocarbon radical having 9 to 22 carbon atoms and p is from 4 to 40, or mixtures of such surfactants.

The HLB value of the surfactants $(X_1)$ is advantageously in the range from 7 to 20, preferably in the range from 8 to 16. Of the compounds of the formula (II), particular preference is given to those in which $R_1$ contains 11 to 18 carbon atoms.

Suitable anion-active surfactants $(X_2)$ are generally acids known per se (or salts thereof) having a emulsifier character, as are usually employed as dispersants, for example as emulsifiers or as detergents. Such surfactant anionic compounds are known in the art and are described in large number in the specialist literature, for example in W. M. LINFIELD "Anionic Surfactants" (Volume 7 of "Surfactant Science Series", Marcel DEKKER Inc., New-York, 1976). Suitable anion-active surfactants are in particular those which contain a lipophilic radical (in particular the radical of a fatty acid or an aliphatic hydrocarbon radical of a fatty alcohol) which contains, for example, 8 to 24 carbon atoms, advantageously 10 to 22 carbon atoms, in particular 12 to 18 carbons, and may be aliphatic or aralipathic and where the aliphatic radicals may be linear or branched, saturated or unsaturated. In the case of carboxylic acids, the lipophilic radicals are preferably purely aliphatic, while in the case of sulphonic acids, the lipophilic radicals are preferably saturated purely aliphatic or aralipathic radicals. Carboxyl groups can be introduced, for example, by oxidation of —$CH_2$—OH groups, carboxyalkylation of hydroxyl groups, for example into the above-mentioned non-ionogenic surfactant oxyalkylation products, where the oxyalkylation can be carried out using oxiranes, principally ethylene oxide, propylene oxide and/or butylene oxide and optionally styrene oxide, and preferably at least 50 mol-% of the oxiranes employed is ethylene oxide; for example, these are products of the addition of from 1 to 12 mol of oxirane onto 1 mol of hydroxyl compounds. The carboxyalkylation is carried out using principally haloalkanecarboxylic acids, advantageously those in which the haloalkyl radical contains 1 to 4 carbon atoms, preferably 1 or 2 carbon atoms, halogen principally stands for chlorine or bromine, and the acid group can optionally be in salt form. A phosphoric acid or sulphuric acid partial ester group can also be introduced, for example, by monoesterification with phosphoric acid or sulphuric acid, for example by reaction of a hydroxyl compound with phosphoric or sulphuric anhydride. Suitable sulphonic acids are essentially products of the sulphonation of paraffins (for example produced by sulphochlorination or sulphoxidation), of c-olefins, of alkylbenzenes and of unsaturated fatty acids or alternatively formaldehyde condensates of sulphonated aromatic compounds (for example of sulphonated naphthalene). The anion-active surfactants are advantageously employed in the form of salts, where for salt formation hydrophilising cations, in particular alkali metal cations (for example lithium, sodium, potassium) or ammonium cations [for example those mentioned above] or alternatively alkaline earth metal cations (for example calcium or magnesium), preferably come into consideration. Of the said anion-active surfactants $(X_2)$, the ester group-free ones are preferred, principally soaps, in particular amine soaps, as well as the products of the carboxymethylation of oxyethylated fatty alcohols and the sulphonic acids, preferably in salt form as mentioned above, particularly as alkali metal salts.

Suitable as amphoteric surfactants $(X_3)$ are in general ampholytes having an emulsifier character which are known per se, as can be employed as dispersants, for example as emulsifiers. Emulsifiers with an amphoteric character are also known in large number in the art and are also described in the specialist literature, for example in B. R. BLUESTEIN and Clifford L. HILTON "Amphoteric Surfactants" (Volume XII of "Surfactant Science Series", Marcel DEKKER Inc., New-York, 1982). Particularly suitable amphoteric surfactants are those which contain a lipophilic radical (in particular the radical of a fatty acid or an aliphatic hydrocarbon radical of a fatty amine) which contains, for example, from 8 to 24 carbon atoms, advantageously from 10 to 22 carbon atoms, in particular from 12 to 18 carbon atoms, and may be aliphatic or araliphatic and where the aliphatic radicals may be linear or branched, saturated or unsaturated, and contain at least one anionic group, for example as mentioned above for the anion-active emulsifiers, and at least one ionic group or at least one basic protonatable group, principally an ammonium group or a basic amino group, covalently bonded in the molecule. The following may be mentioned by way of example: carboxybetaines and sulfobetaines, fatty aminopropionic acids, products of the carboxymethylation of products of the sulfomethylation or products of the 3-sulpho-2-hydroxypropylation of fatty amines or of products of the adduction of oxiranes, (preferably ethylene oxide) onto fatty amines, and products of the 3-sulpho-2-hydroxypropylation of fatty acid N-[2-(β-hydroxyethylamino)ethyl]amides.

The surfactants (X) are advantageously employed in amounts which are sufficient to enable $(P_A)$ and, if used, (G) to be well dispersed in the aqueous phase and to enable a particularly stable aqueous dispersion of $(P_A)$ and (G)—which optionally also contains (F)— to be formed.

The amount of (X) employed is advantageously ≦80%.by weight of $(P_A)$, preferably ≦50% by weight of $(P_A)$, particularly preferably from 0 to 30% by weight of $(P_A)$. If $(P_A)$ is self-dispersible to colloidally soluble [preferably $(P_A')$], (X) is not necessary. Preferably, no surfactant (X) is employed.

Suitable as (Y) are any desired compounds known per se as are usually used for adjusting the pH of textile treatment agents, for example the above-mentioned bases, or alternatively buffer salts, such as, for example, sodium acetate or mono- or disodium phosphate, or occasionally also acids (for example a monobasic mineral acid, in particular hydrochloric acid, or preferably a low-molecular-weight aliphatic carboxylic acid, preferably having 1 to 4 carbon atoms, for example formic acid, acetic acid or lactic acid), for example in order to compensate for excess base.

The pH of the dispersions (W) can vary widely and can optionally be adjusted by addition of (Y); it is preferably in the range from 5 to 9, particularly preferably from 6 to 8.

The dispersions (W) may optionally additionally contain at least one formulation additive (Z), in particular
($Z_1$) an agent which inhibits bacterial growth or a microbicide,
or ($Z_2$) a reducing agent or a bleaching agent.

Suitable as ($Z_1$) are especially fungicides and bactericides, for example commercial products, which can be employed in the concentrations recommended in each case. As ($Z_2$), conventional reducing agents or bleaching agents can be employed, in particular reductive bleaching agents, such as, for example, sodium bisulphite. Suitable concentrations of (Z) are, for example, in the range from 0 to 4% by weight, preferably from 0.0001 to 2% by weight, particularly preferably from 0.001 to 1% by weight, based on (W).

Particularly worth of mention are the dispersions (W'), which essentially consist of $(P_A)$ and water and optionally one or more of the additives (F), (G), (X), (Y) and/or (Z) [for example of $(P_A)$ and water and optionally one or more of the additives (F), (G), (X), (Y) and/or (Z)], particularly the dispersions (W"), which essentially consist of $(P_A')$, water and preferably (F) and/or (G) and in addition optionally one or more of the additives (Y) and/or (Z), particularly of $(P_A")$ or $(P_A''')$ and water and preferably (F) and/or (G) and optionally one or more of the additives $(Z_1)$, $(Z_2)$ and/or (Y).

Preferred thickening agents (G) are polyacrylamides and/or acrylamide/acrylic acid copolymers, if desired in salt form, which have optionally been at least partially methylolated with formaldehyde.

The (F)- and optionally (G)-containing dispersions (W) and/or colloidal solutions, in particular (W') and preferably (W"), can be produced by suitable mixing of the components, in particular by mixing $(P_A)$, for example as a melt, with (F), adding water and, in the presence of water, optionally mixing with (G) and/or (X) successively in any desired sequence, and optionally adding further additives, particularly at least one of the additives (X), (Y) and/or (Z). If (X) is added, it may, if desired, also be admixed directly with the melt. The dispersions and/or colloidal solutions (W) according to the invention can be produced, in particular, by mixing $(P_A)$, if desired as a mixture with (F) and/or (X), with water and optionally with (Z) and optionally with an aqueous solution or dispersion of (G) and optionally with aqueous (X) and/or (Y) and/or further (Z). Possible methylolation of polyacrylamides and/or acrylamide-acrylic acid copolymers can take place by simple admixture of the requisite amount of formaldehyde or formaldehyde-releasing compound (for example paraformaldehyde) into the aqueous solution of the polyacrylamide and/or acrylamide-acrylic acid copolymer in the above-mentioned pH range at temperatures, for example, of from 10 to 40° C.

According to a particular embodiment of the invention, thickening agents (G) are employed which are polyacrylamides and/or acrylamide-acrylic acid copolymers, if desired in salt form, which have been at least partially methylolated with formaldehyde.

According to another embodiment of the invention, it is also possible to use no thickening agent (G) at all.

The above-described polyamides $(P_A)$, preferably in the form of aqueous dispersions (W), are used as wet-acting lubricants, i.e. as auxiliaries in the treatment of textile fabrics with treatment agents (T) (for example pretreatment, dyeing, optical brightening or after-treatment) by exhaust methods under conditions under which per se otherwise transport folds can form or friction can occur in or on the substrate, where the dispersions (W) to be employed in accordance with the invention serve particularly for preventing the stabilisation and marking of the folds formed during the treatment and for preventing damaging friction. Such processes are essentially exhaust processes from short liquor (liquor/substrate weight ratio, for example, in the range from 3:1 to 40:1, mostly from 4:1 to 20:1)—in particular in jet dyeing machines or in winch becks—under the treatment conditions and times which are usual per se (for example in the range from 20 minutes to 12 hours) as occur in particular in winch becks and especially in jet dyeing machines.

The dispersions (W) or the polyamides ($P_A$), even in the presence of (G), have an optimum wet slippage behaviour, so that effective distribution on the surface of the wet fabric is possible on their use, after which they can in general be removed again by discharging the liquid and/or eliminated by washing and/or rinsing operations required by the process.

The exhaust processes for the treatment with (T) are in general carried out in aqueous medium and the treatment in the dyeing machine is usually concluded with a washing and/or rinsing for removing non-fixed (T) and any by-products, by which also ($P_A$) is removed.

The treatment agents (T) are in general textile chemicals (in particular textile finishing chemicals) which can be removed from the substrate again for the part which is not fixed to the substrate, for example by washing and/or rinsing, after the respective treatment of the substrate.

As (T), the following sub-groups, in particular, come into consideration:

($T_1$) pre-treatment agents (principally wetting agents, detergents, bleaching agents, enzymes, sequestering agents and alkalis and, if desired, corresponding auxiliaries, as can be used in pre-treatment for desizing, scouring, bleaching, enzyme treatment and other cleaning), ($T_2$) main treatment agents (principally wetting agents, dyes, dyeing auxiliaries and optical brighteners), and ($T_3$) after-treatment agents (principally fixing agents, finishing agents, detergents and reducing agents);

where the respective treatments are carried out in aqueous medium.

Processes in which transport folds (i.e. running folds) can form in the textile substrate are essentially taken to mean those in which the wet substrate tends to lie in folds during its transport in the dyeing machine due to the action and possibly interference of various forces. The folds which form in such processes can per se result in marking of the crease points due to stabilisation during the treatment process, which can result in the disadvantages mentioned at the outset. In such processes, the polyamides ($P_A$) or the compositions (W) (dispersions or colloidal solutions) serve as wet-acting lubricants, in particular as agents for preventing transport folds, to the extent that they favour or facilitate slip of the wet fabric or the wet folds and thus can prevent damaging stabilisation of the transport folds. Treatment processes which would per se cause transport folds are principally treatments on a winder (in particular in a winch beck) or especially in jet dyeing machines, in which the substrate is in each cycle fed over the winder or through the nozzle, at which point the fold formation and/or the forces acting on the folds, which can result in stabilisation of the folds, are the strongest.

Processes in which friction can take place in or on the textile substrate are essentially taken to mean those in which the wet substrate during its transport in the dyeing machine rubs against apparatus parts or adjacent substrate parts due to high running speed, passage through nozzles and/or a change in the transport direction and/or speed. The chafe points formed in such processes can result in marking thereof during the treatment process and in impairment of the physical properties of the substrate. In such processes, the polyamides ($P_A$) or the compositions (W) serve as wet-acting lubricants to the extent that they favour or facilitate slip of the wet fabric (particularly on adjacent fabric or on metal) and thus can prevent damaging friction of the substrate. Possible treatment processes which would per se cause chafe points are principally treatments in jet dyeing machines, in which the substrate is in each cycle passed through the nozzle, at which point the relative acceleration and/or the forces acting on the substrate are the greatest, and in which the substrate is in each cycle pulled from its own position in the liquor toward the nozzle, so that the substrate-against-substrate acceleration or substrate-against-metal acceleration can at the respective points cause friction in places, which can result in the said chafe points.

Suitable substrates for the process according to the invention and for the wet-acting lubricants according to the invention are in general any desired substrates as can be employed in the said processes, principally those which contain synthetic fibres, especially polyamide fibres, optionally in a blend with other fibres, in particular with other synthetic fibres (for example acrylic fibres or polyurethane fibres) or optionally modified natural fibres, for example of wool, silk or optionally modified cellulose (for example cotton, linen, jute, hemp, ramie, viscose rayon or cellulose acetate), where fibre blends of synthetic polyamide with other fibres that may be mentioned are, for example, polyamide/cotton, polyamide/polyacrylic, polyamide/wool, polyamide/polyurethane and polyamide/cotton/polyurethane. The textile substrate can be employed in any desired form as piece goods, as can be treated in the processes mentioned, for example as tubular goods, as open textile webs or alternatively as semi-finished goods, essentially in rope form or tubular form, as is suitable for winders or especially jet dyeing machines; both knitted goods and woven fabrics can be employed (for example fine to coarse simple knitted goods or interlocks, fine to coarse woven fabrics, terry goods, velvet and open-work and/or machine-embroidered textiles), in particular also goods made from microfibres, principally polyamide microfibres and blends thereof with other correspondingly fine fibres, for example silk, wool and/or cotton.

The wet-acting lubricants according to the invention, i.e. polyamides ($P_A$) or compositions (W), are advantageously employed in such concentrations that fold marking and chafe point formation are effectively prevented in the respective process. They are distinguished by their effectiveness and yield and can exhibit a very high action in very low concentrations; they are advantageously employed in concentrations which correspond to from 0.005 to 2 g of ($P_A$) per liter of liquor, preferably from 0.01 to 1 g of ($P_A$) per liter of liquor, particularly preferably from 0.03 to 0.6 g of ($P_A$) per liter of liquor.

They can be produced in a simple and readily reproducible way, in particular as described above, and are also distinguished by the constancy of their properties—even in different lots—and the aqueous concentrated compositions (W) are distinguished by their stability to storage, shipment, transfer and pumping.

Since the wet-acting lubricants according to the invention, i.e. polyamides ($P_A$) or compositions (W), are also distinguished by their great independence of temperature variations and are substantially electrolyte-resistant, they can also be employed in a very wide selection of treatment conditions as occur for treatment with textile chemicals (T) in industry, in particular for pretreatment with ($T_1$), for dyeing or optical brightening with ($T_2$) and for after-treatment with ($T_3$), for example with ($T_1$) during desizing or during other cleaning or during bleaching, with ($T_2$) during dyeing or optical brightening or with ($T_3$) during after-treatment, but especially during dyeing or optical brightening. The dyeing or optical brightening can be carried out using any desired dyes or optical brighteners ($T_2$) and optionally dyeing auxiliaries ($T_2$) which are suitable for the respective substrate and process and for the desired effect. For the dyeing of polyamide-containing substrates, any desired corresponding dyes, principally anionic dyes, for example acid dyes, reactive dyes, vat dyes and sulphur dyes, of which especially the so-called "neutral-build-up" acid dyes and optionally dyeing auxiliaries (for example wetting agents and/or levelling agents) can be employed, where the dyeing of substrates made from fibre blends, in particular made from cellulose fibres and synthetic fibres, can also be carried out using corresponding suitable dyes, in particular reactive dyes, direct dyes, vat dyes or sulphur dyes (and optionally also corresponding dyeing auxiliaries). The processes can pass through any desired temperature regions as used for the respective substrate and the treatment agent employed and as a result of the apparatus and the desired purpose, for example from room temperature (for example at the beginning of dyeing) up to <100° C. (for example at from 80 to 98° C.) or even higher, for example under HT (high temperature) conditions, for example up to 140° C. (for example in the range from 102 to 140° C., in the closed apparatus), principally in the temperature range from 80 to 120° C. The electrolyte content of the liquors can also be as desired, as otherwise usually used for the respective process, for example corresponding to the alkali metal salt (for example sodium chloride or sodium sulphate) concentrations or/and acid or alkali metal hydroxide or carbonate concentrations, as used in dyeing with said dyes.

The pH values can be as desired, as are suitable for the respective substrates, dyes and application processes. For polyamide dyeings with acid dyes, suitable pH values are, for example, in the acidic to weakly basic region (for example in the pH range from 3 to 9, advantageously from 3.5 to 8, preferably from 4.5 to 7).

The polyamides ($P_A$) or their aqueous compositions (W) are advantageously employed as wet-acting lubricants in dyeing or optical brightening, particularly in jet dyeing machines (both those with hydrodynamic liquor transport and those with aerodynamic liquor transport), preferably for dyeing of polyamide-containing substrates, particularly preferably of those essentially consisting only of synthetic polyamide fibres (particularly also microfibres).

For use in the treatment of synthetic polyamide fibres, particularly preferred polyamides or oligoamides ($P_A$) are polyamides or oligoamides ($P_A'''$) in which the hydrophobic part originates from starting compounds ($A_1$) and ($B_1$) or is built up from monomer units which are directly homologous to (particularly ±1 to 2 carbon atoms) or preferably identical with those originating or built up from the fibre polymer to be treated. Thus, if, for example, the synthetic polyamide substrate to be treated is a polyamide made from adipic acid and hexamethylenediamine (i.e. a nylon 6,6), the hydrophobic part of ($P_A$) or ($P_A'''$) preferably essentially consists of amide units made from adipic acid and hexamethylenediamine, while the hydrophobic part then preferably essentially consists of ($A_2$), in particular an aminopropylated polyethylene/propylene glycol of the "Jeffamine" type.

Due to the high resistance to temperature variations even at relatively high temperatures, the wet-acting lubricants according to the invention, i.e. polyamides ($P_A$) or dispersions (W), can be employed under the said conditions and shown to optimum advantage without their action being impaired. Due to the high shear force stability of the wet-acting lubricants (W), particularly those which consist only of ($P_A$) and (G) and optionally (F), (X), (Y) and/or (Z), in aqueous dispersion or colloidal solution, these are also particularly suitable as wet-acting lubricants in jet dyeing machines, especially also in those in which the goods or the liquor are subjected to extremely high dynamic loads, or in which very high shear forces develop in the liquor.

The dispersions (W) or the polyamides (or oligoamides) ($P_A$) [in particular ($P_A'$) or ($P_A''$) or even ($P_A'''$)] have, even in very short liquors, for example at liquor/goods ratios of ≦15/1, particularly also ≦10/1, a very good, extremely superficial wet slippage action—especially the (G)-containing ones—, in particular to the extent that they cause the lubricant to accumulate at the goods surface and the liquor to accumulate in the immediate vicinity of the lubricant and, as a flowing liquor layer, facilitates wet slippage of the goods to a surprisingly high degree.

Through the use of the wet-acting lubricants ($P_A$) according to the invention, particularly in the form of their aqueous preparations (W), in particular optimally dyed and/or optically brightened materials may be obtained, in which the action of the respective treatment agent (pre-treatment agent, dye, optical brightener or after-treatment agent) is not impaired and an optimum goods appearance is obtained, even on use of very short liquors, even if almost all the liquor is on the goods during the process and almost no liquor remains over in the apparatus base.

The effectiveness of the polyamides ($P_A$) and the preparations (W) as wet-acting lubricants (or slip agents) can be determined, for example, as follows by measurement of the coefficient of friction: a first piece of fabric is tensioned in contact with the inside base of a shallow, flat trough, fixed at one end with a clamp and covered with an amount of liquor which corresponds to the liquor ratios which are usual in practice; a 200 g weight with a smooth, flat, rectangular base on which a second piece of the same fabric is tensioned and fixed is placed horizontally on top. The laid-on weight covered with the second piece of fabric (="sledge") is then pulled in the longitudinal direction of the trough and of the first tensioned piece of fabric (="track") until it starts moving and until it reaches a constant speed, and the traction force necessary to set the "sledge" in motion horizontally on the "track", starting from the end fixed with the clamp, and to move it horizontally in the traction direction at constant speed is determined. Both the static friction and the kinetic friction and thus both the static coefficient of friction and the kinetic coefficient of friction can thus be determined.

If $N_0$ denotes the normal force (i.e. the weight of the "sledge" on the "track"), $Z_S$ denotes the horizontal traction force which is necessary to set the "sledge" in motion on the "track", and $Z_K$ denotes the horizontal traction force which is necessary to keep the "sledge" moving at a constant speed on the "track", the static coefficient of friction $\mu_S$ can be expressed by the following formula $$\mu_s = \frac{Z_s}{N_0}$$

and the kinetic coefficient of friction pK by the following formula $$\mu_K = \frac{Z_K}{N_0}$$

Use of ($P_A$) allows not only $\mu_K$ but also $\mu_S$ to be reduced to very low values.

The overall effectiveness of the wet-acting lubricants can be observed visually by checking the correspondingly treated goods in order to determine chafe points or transport fold marks (for example on a dyeing).

In the following examples, the parts denote parts by weight and the percentages denote percentages by weight; the temperatures are given in degrees Celsius. The products additionally added to the oligoamides in the examples (production, dispersion and application examples) are commercially available products. In the application examples, the dyes are employed in commercially available form with a pure dye content of about 25%, the concentrations given relate to this form and are based on the substrate weight. C.I. stands for Colour Index. The O,O'-bis(2-aminopropyl)-polyalkylene glycols ($A_{21}$) and ($A_{22}$), polyacrylamides ($G_1$) and ($G_2$) and biocide ($Z_{11}$) employed in the following examples are the following O,O'-Bis(2-aminopropyl)polyalkylene glycols ($A_{21}$) and ($A_{22}$):

O,O'-bis(2-aminopropyl)polyalkylene glycols of the average formula

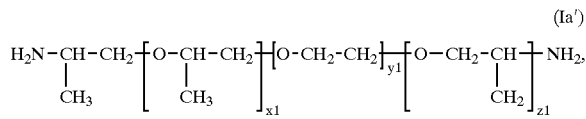
(Ia')

in which in ($A_{21}$)

$$\frac{x1+z1}{y1} = \frac{3.5}{15.5}$$

molecular weight $\overline{M}_w = 900$ in ($A_{22}$)

$$\frac{x1+z1}{y1} = \frac{5.5}{37.5}$$

molecular weight $\overline{M}_w = 2150$

Polyacrylamide ($G_1$): acrylamide-sodium acrylate copolymer with an average molecular weight $\overline{M}_w$ of $2 \cdot 10^7$ and 27±3 mol-% of $CH_2CHCOONa$ monomer units Polyacrylamide ($G_2$): polyacrylamide homopolymer with an average molecular weight MW of $2 \cdot 10^6$ Biocide ($Z_{11}$): 1.5% aqueous solution of 2-methyl4-isothiazolin-3-one which also contains 1.75% of $Mg(NO_3)_2$, 0.85% of $MgCl_2$ and 0.12% of $Cu(NO_3)_2$.

EXAMPLE 1

Dispersion ($W_1$)

161.4 parts of O,O'-bis(2-aminopropyl)polyalkylene glycol ($A_{21}$) and 44.8 parts of adipic acid are heated to 180° C. with stirring and under nitrogen. As soon as this temperature has been reached, 14.8 parts of molten hexamethylenediamine at 50° C. are added dropwise, and the temperature is maintained further at 180° C. until the acid number of the reaction mixture is <10. About 11 parts of water are distilled off during this time. Cooling is then begun, and at the same time 63 parts of glycerol are added. The addition of 1123.4 parts of water is begun at 140° C., the temperature being lowered from 140° C. to 100° C. by the addition of the first 150 parts and the internal temperature being 30° C. after addition of all the water. 1.4 parts of biocide ($Z_{11}$) are then added, and the pH is set to 7.0±0.2 using about 2.2 parts of 30% sodium hydroxide solution. 1400 parts of dispersion ($W_1$) are obtained.

Dispersion ($W_{G1}$)

2782.8 parts of water are initially introduced, and 4.6 parts of copolymer ($G_1$) are added. As soon as a homogeneous solution is present, 1400 parts of dispersion ($W_1$) are added to the polyacrylamide solution. 4.2 parts of biocide ($Z_{11}$) are then added. 4191.6 parts of dispersion ($W_{G1}$) are obtained.

EXAMPLE 2

The procedure is as described in Example 1, with an aqueous formaldehyde solution being added to copolymer ($G_1$) in part b), after addition of dispersion ($W_1$), in a weight ratio of 1 parts of 37% formaldehyde solution per 1000 parts of dispersion ($W_{G1}$) and being reacted with the copolymer at room temperature to form methylol groups. Dispersion ($W_{G2}$) is thereby obtained.

EXAMPLE 3

The procedure is as described in Example 1, with the following products being employed for the respective dispersions ($W_3$) and ($W_{G3}$):

a) Dispersion ($W_3$)

190.3 parts of O,O'-bis(2-aminopropyl)polyalkylene glycol ($A_{22}$)

19.4 parts of adipic acid 5.1 parts of hexamethylenediamine 63 parts of glycerol 1125.6 parts of water 1.4 parts of biocide ($Z_{11}$) (distillate: 4.7 parts)

b) Dispersion ($W_{G3}$)

2782.8 parts of water 4.6 parts of copolymer ($G_1$)

1400 parts of dispersion ($W_3$)

4.2 parts of biocide ($Z_{11}$)

EXAMPLE 4

Polyamide ($P_{A1}$)

175.2 parts of O,O'-bis(2-aminopropyl)polyalkylene glycol ($A_{22}$) and 28.6 parts of adipic acid are heated to 150° C. with stirring and under nitrogen. When this temperature has been reached, 13.3 parts of molten hexamethylenediamine at 50° C. are added dropwise, and the mixture is allowed to react at 150° C. for 15 hours, during which the acid number of the reaction mixture reaches a value of ≦10 and 7.1 parts of water are produced as distillate. The molten polyamide is subsequently discharged and allowed to solidify. 210 parts of polyamide ($P_{A1}$) are obtained.

b) Dispersion ($W_4$)

1190 parts of water and 210 parts of polyamide ($P_{A1}$) are heated to 80° C. with stirring and at this temperature stirring is continued until a homogeneous dispersion is present, which is then cooled to room temperature. 1400 parts of dispersion ($W_4$) are obtained.

EXAMPLE 5

Dispersions ($W_5$) and ($W_{G5}$)

The procedure is as described in Example 1 for dispersions ($W_1$) and ($W_{G1}$), with the difference that, instead of glycerol, the same amount of 1,2-propylene glycol is employed.

EXAMPLE 6

Dispersion ($W_{G6}$)

The procedure is as described in Example 1, with the difference that for the production of dispersion ($W_{G6}$) the following procedure is used in part b):

783.6 parts of a 30% aqueous solution of the polyacrylamide ($G_2$) are diluted with 2007 parts of water. 3 parts of acrylamide-sodium acrylate copolymer ($G_1$) are subsequently added. As soon as a homogeneous solution is present, 3 parts of a 37% aqueous formaldehyde solution and subsequently 1400 parts of dispersion ($W_1$) are added. 4196.6 parts of dispersion ($W_{G6}$) are obtained.

EXAMPLE 7

Dispersion ($W_7$)

161.4 parts of O,O'-bis(2-aminopropyl)polyalkylene glycol ($A_{21}$) and 50 parts of adipic acid are heated to 180° C.

with stirring and under nitrogen and stirring is continued at this temperature for one hour. 15,96 parts of molten hexamethylenediamine at 50° C. are added dropwise during one hour, and the temperature is maintained at 180° C. for 1.5 hour and then 2.88 further parts of hexamethylenediamine are added followed by the addition of 63 parts of glycerol during one hour, and stirring is continued at this temperature for one further hour. Cooling is then begun and at 160° C. 450 parts of water at 50° C. are added, by which the temperature is lowered to 100° C. At this temperature 4.8 parts of aqueous 40% sodium bisuphite solution are added, followed by 1327 parts of water, the internal temperature being 30° C. after addition of all the water. 5.6 parts of biocide ($Z_{11}$) are then added, and the pH is set to 8.0±0.2 with 30% sodium hydroxide solution. 2070 parts of dispersion ($W_7$) are obtained.

b) Dispersion ($W_{G7}$)

2056 parts of water are initially introduced, and 3.4 parts of copolymer ($G_1$) are added. As soon as a homogeneous solution is present, 2070 parts of dispersion ($W_7$) are added to the polyacrylamide solution. 6.2 parts of aqueous 37% formaldehyde solution are added at room temperature to form methylol groups, and 5.5 parts of biocide ($Z_{11}$) are then added. 4141.1 parts of dispersion ($W_{G7}$) are obtained.

Application Example A

Dyeing of Polyamide Knitted Goods in the Jet (Mathis Laboratory Jet)

A piece of polyamide knitted goods is dyed as follows in a Mathis laboratory jet: 90 parts of polyamide knitted goods are introduced into the jet, which contains 900 parts of aqueous liquor and 1 part of dispersion ($W_{G1}$). 0.23 part of C.I. Acid Yellow 256, 0.20 part of C.I. Acid Red 57, 0.41 part of C.I. Acid Blue 72, 1 part of an cationic levelling agent (alkylamine ethoxylate), 1 part of acetic acid (pH of the liquor 5.0) are added to the liquor, and the liquor is heated from room temperature to 98° C. at a rate of 1° C./min, and dyeing is continued at 98° C. for 30 minutes. This is followed by re-cooling and rinsing twice with water. The liquor is then discharged, the goods are unloaded and dried in free air at room temperature. Anthracite grey, uniformly dyed goods having a very attractive goods appearance are obtained.

Application Example B

Dyeing of Polyamide Microfibre Fabric in the Jet (Mathis Laboratory Jet)

A piece of polyamide microfibre fabric is dyed as follows in a Mathis laboratory jet: 90 parts of polyamide microfibre fabric are introduced into the jet, which contains 900 parts of aqueous liquor and 2 parts of dispersion ($W_{G1}$). 0.41 part of C.I. Acid Orange 67, 0.47 part of C.I. Acid Red 336, 0.47 part of C.I. Acid Blue 350, 1 part of an cationic levelling agent (alkylamine ethoxylate) and 1 part of an acid donor (Sandacid VS fl.) are added to the liquor. The pH of the liquor is adjusted to 8.5 with calcined soda, and the liquor is then heated from room temperature to 98° C. at a rate of 1° C./min and dyeing is continued at 98° C. for 30 minutes. This is followed by re-cooling and rinsing twice with water. The liquor is then discharged, the goods are unloaded and dried in free air at room temperature. Brown, uniformly dyed goods having a soft hand and a very attractive goods appearance are obtained.

Application Example C

Dyeing of Polyamide Microfibre/Elastane Blend Fabric in the Jet (Mathis Laboratory Jet)

100 parts of polyamide microfibre/elastane blend fabric 93/7 are introduced into 900 parts of an aqueous liquor, warmed to 40° C., which contains 2 parts of dispersion ($W_{G1}$). A solution of 7.0 parts of C.I. Acid Black 194 and 1 part of an acid donor (Sandacid VS fl.) are added to the bath, and the pH of the liquor is adjusted to 8.0 with calcined soda. The mixture is then heated from 40° C. to 98° C. at a rate of 1.5° C./min. The dyeing is carried out at 98° C. for a further 45 minutes, and the bath is then cooled to 60° C. at a rate of 2° C./min. After finishing in a conventional manner (rinsing, drying), a very level black dyeing having a perfect goods appearance is obtained.

Each of the dispersions ($W_{G2}$), ($W_{G3}$), (WG5), ($W_{G6}$), ($W_{G7}$), ($W_1$), ($W_2$), ($W_3$), ($W_4$), ($W_5$) and ($W_7$) are employed in application examples A, B and C in an analogous manner to dispersion ($W_{G1}$)

What is claimed is:

1. A method for the treatment of textile piece goods in rope form or tubular form by an exhaust process from aqueous liquor, comprising the steps of:

providing textile piece goods;

applying ($P_A$) water-dispersible or colloidally soluble polyamides containing hydrophilic polyalkylene glycol ether chains in the skeletal structure as wet-acting lubricants, and then applying a textile treatment agent (T) consisting essentially of ($T_1$) pre-treatment agents, ($T_2$) main treatment agents, or ($T_3$) after-treatment agents;

wherein said ($P_A$) is made from ($A_1$) aliphatic, araliphatic diamines which contain no hydrophilic components or substituents, ($A_2$) a diamine of the average formula

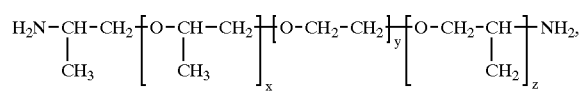

(Ia)

in which x denotes a number $\geq 0$, y denotes a number $\geq 2$ z denotes a number $\geq 1$ and the sum x+y+z=3 to 100, with the proviso that y [$\geq$x+z,] is in the range from 2(x+z) to 10(x+z), and ($B_1$) alkanedicarboxylic acids having 2 to 36 carbon atoms, aromatic dicarboxylic acids having one to three benzene rings, two of which may optionally be fused, or araliphatic dicarboxylic acids which contain 9 to 18 carbon atoms and contain one benzene ring or two optionally fused benzene rings, where aromatic rings may be bonded to further aliphatic, aromatic or araliphatic parts of the molecule, optionally via oxygen.

2. The method according to claim 1, where ($A_1$) is a $C_4$–$C_8$-alkanediamine.

3. The method according to claim 1, where ($B_1$) is an alkanedicarboxylic acids having 2 to 36 carbon atoms.

4. The method according to claim 1, where ($A_1$) is hexamethylenediamine and (B1) is adipic acid.

5. The method according to claim 1, where ($P_A$) is employed in the form of an aqueous, concentrated preparation (W).

6. The method according to claim 5, where (W) is an aqueous preparation or colloidal solution which is characterised by a content of ($P_A$) and (F) a flow-control agent selected from the group consisting of propylene glycol, butanediol, hexylene glycol, dipropylene glycol, butyl diglycol and glycerol, and/or (G) a thickening agent selected from the group consisting of homopolyacrylamides, copolyacrylamide acrylic acids, and partially saponified polyacrylamides.

7. The method according to claim 6, where (W), in addition to ($P_A$), (F) and/or (G), contains at least one of the following components (X) a non-ionogenic emulsifier or a mixture of non-ionogenic emulsifiers or a mixture of non-ionogenic emulsifiers and anionic or amphoteric emulsifiers or a mixture of non-ionogenic emulsifiers, anionic emulsifiers and amphoteric emulsifiers, (Y) at least one agent for setting the pH and (Z) at least one formulation additive selected from
($Z_1$) an agent which inhibits bacterial growth or a microbiocide or ($Z_2$) reducing agent or a bleaching agent.

8. The method according to claim 1, where (T) is at least one dye or at least one optical brightener.

9. The method according to claim 1, in the dyeing or optical brightening of textile material made from synthetic polyamide fibres, optionally blended with other fibres, in jet dyeing machines.

10. The method according to claim 1, in the dyeing or optical brightening of textile material made from synthetic polyamide microfibres, optionally blended with other fibres of comparable fineness.

11. Wet-acting lubricant for the dyeing or optical brightening of textile piece goods in rope or tubular form by exhaust methods from aqueous liquor under conditions which would otherwise in the textile substrate favour the formation of transport folds or the occurrence of friction in or on the substrate, comprising a content of a water-dispersible or colloidally soluble polymide ($P_A$) wherein said ($P_A$) is made by the process comprising the steps of reacting ($A_1$), ($A_2$) and ($B_1$), wherein ($A_1$) a $C_4$–$C_8$-alkanediamine, ($A_2$) a diamine of the average formula

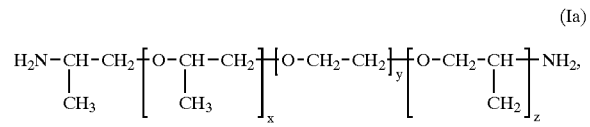

(Ia)

in which
x denotes a number $\geq 0$
y denotes a number $\geq 2$
z denotes a number $\geq 1$,
and the sum x+y+z=3 to 100, with the proviso that y is in the range from 2(x+z) to 10(x+z), and ($B_1$) alkanedicarboxylic acids having 2 to 36 carbon atoms and adding during the reaction at the beginning of the cooling off period (F) a flow-control agent selected from the group consisting of propylene glycol, butanediol, hexylene glycol, dipropylene glycol, butyl diglycol and glycerol.

12. Wet-acting lubricant according to claim 11, further comprising, water and (G) a thickening agent selected from the group consisting of homopolyacrylamides, copolyacrylamide-acrylic acids, and partially saponified polyacrylamides and optionally at least one of the additives (X) a non-ionogenic emulsifier or a mixture of non-ionogenic emulsifiers or a mixture of non-ionogenic emulsifiers and anionic or amphoteric emulsifiers or a mixture of non-ionogenic emulsifiers, anionic emulsifiers and amphoteric emulsifiers, (Y) at least one agent for setting the pH and (Z) at least one formulation additive selected from
($Z_1$) an agent which inhibits bacterial growth or a microbiocide or ($Z_2$) reducing agent or a bleaching agent.

13. A method for the treatment of textile piece goods in rope form or tubular form by an exhaust process from aqueous liquor, comprising the steps of:

providing textile piece goods;

applying ($P_A$) water-dispersible or colloidally soluble polyamides which contain hydrophilic polyalkylene glycol ether chains in the skeletal structure as wet-acting lubricants, and then applying a textile treatment agent (T) consisting essentially of
($T_1$) pre-treatment agents,
($T_2$) main treatment agents, or
($T_3$) after-treatment agents;

wherein said ($P_A$) is made from ($A_1$) $C_2$–$C_{18}$ alkanediamines, ($A_2$) a diamine of the average formula

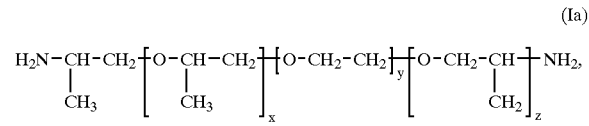

(Ia)

in which
x denotes a number $\geq 0$,
y denotes a numbers $\geq 2$
z denotes a number $\geq 1$,
and the sum x=3 to 100, with the proviso that y is in the range from 2(x+z) to 10(x+z), and ($B_1$) alkanedicarboxylic acids having 2 to 36 carbon atoms.

* * * * *